Feb. 18, 1958  L. L. LA BARRE  2,823,937
V-BELT PULLEY
Filed Sept. 28, 1955
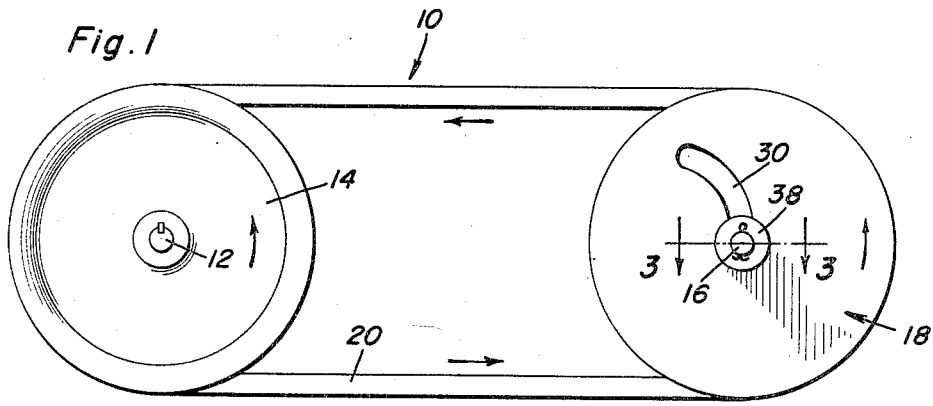
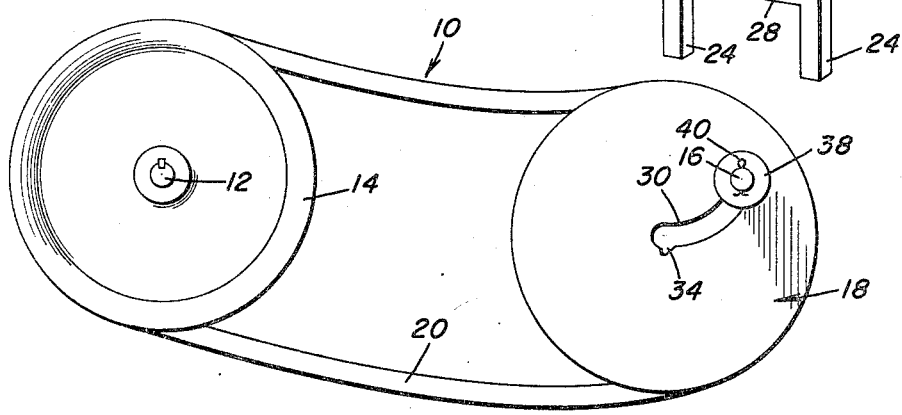
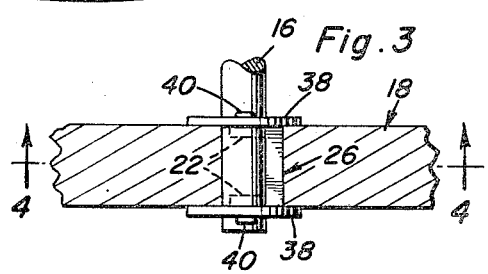
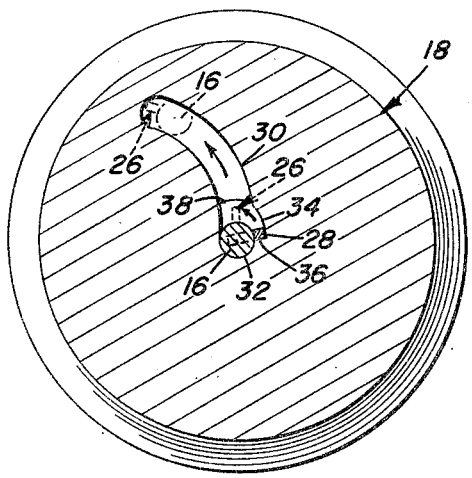
Leo L. LaBarre
INVENTOR.
BY *Clarence A. O'Brien
and Harvey B. Jackson*
Attorneys United States Patent Office 2,823,937
Patented Feb. 18, 1958

2,823,937

V-BELT PULLEY

Leo L. La Barre, Webster, N. Dak.

Application September 28, 1955, Serial No. 537,198

4 Claims. (Cl. 287—52)

This invention relates in general to new and useful improvements in drive assemblies, and more specifically to an improved V-belt pulley and shaft connection.

V-belt pulleys are provided in their peripheral edge with V-grooves for reception of the V-belt. Because of the V-grooves in the pulleys, a pair of V-belt pulleys cannot be maintained at a predetermined spacing and the V-belt installed thereon. If the pulleys are maintained at the predetermined spacing and the V-belt is stretched to go over them, then the V-belt is too loose for the proper driving connection with the pulleys. In order to obtain the proper tension in the V-belt, it is necessary that there be provided suitable belt tighteners, the belt tighteners being in the form of means for shifting the pulleys with respect to each other.

It is therefore the primary object of this invention to provide an improved V-belt pulley which is constructed whereby it may be shifted with respect to its supporting shaft so that it will move towards the other V-belt pulley of a pair of V-belt pulleys whereby the V-belt connecting the two pulleys will be readily slacked and may be readily removed.

Another object of this invention is to provide an improved V-belt pulley and shaft connection which includes an elongated slot terminating in one end of the center of the pulley, the shaft being normally disposed in the center end of the slot and being connected to the pulley by a suitable key, the pulley being rotatable on the shaft and being movable with the shaft fastened up into the slot so that the pulley may move towards another pulley of a pair of pulleys.

Another object of this invention is to provide an improved key and slot connection between a V-belt pulley and a shaft, the key being releasable from the pulley by rotating the pulley with respect to the shaft.

A further object of this invention is to provide an improved V-pulley and shaft connection which is of such nature whereby, when the pulley is moved in a direction opposite to its normal direction of drive, it will move with respect to the shaft so as to automatically slack a belt entrained thereover and will move in the direction of its drive to automatically tension the V-belt entrained thereover.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is an elevational view showing a V-belt drive assembly incorporating the V-belt pulley which is the subject of this invention and shows the pulley in its normal operating position;

Figure 2 is a view similar to Figure 1 and shows the pulley, which is the subject of this invention, moved to a belt-slackening position;

Figure 3 is an enlarged fragmentary sectional view taken substantially upon the plane indicated by the section line 3—3 of Figure 1 and shows the general details of the connection between the V-belt pulley and its associated shaft;

Figure 4 is an enlarged fragmentary vertical sectional view taken substantially upon the plane indicated by the section line 4—4 of Figure 3 and further shows the connection between the shaft and the V-belt pulley, the progressive steps of disconnecting the shaft from the pulley being illustrated by dotted lines; and Figure 5 is an enlarged perspective view of a key carried by the shaft.

Referring now to the drawings in detail, it will be seen that there is illustrated in Figure 1 a conventional V-belt drive assembly which is referred to in general by the reference numeral 10. The V-belt drive assembly 10 includes a shaft 12 which has keyed thereon a conventional type of V-belt pulley 14. Spaced from the shaft 12 is a shaft 16 on which there is mounted the V-belt pulley which is the subject of this invention, the pulley being referred to in general by the reference numeral 18. Entrained over the pulleys 14 and 18 and connecting the two together is a V-belt 20.

The shaft 16 is provided with a pair of spaced openings 22 in which there are received legs 24 of a key which is referred to in general by the reference numeral 26. The legs 24 are connected together by a web 28. It is to be understood that other types of keys may be utilized with respect to the present invention, although the key 26 is preferred.

Referring now to Figure 4 in particular, it will be seen that there is formed in the pulley 18 a curved slot 30 which terminates at its inner end at the center of the pulley 18 and extends adjacent the peripheral edge thereof. The inner end of the slot 30 is semi-circular in cross-section as at 32 and normally has the shaft 16 seated thereagainst. Extending outwardly to one side of the inner end of the slot 30 is a key slot 34 in which the web 28 of the key 26 normally seats. The web 28 bears against a shoulder 36 to effect the driving relation between the pulley 18 and the shaft 16.

Assuming that the pulley 18 is being driven by the V-belt 20, the shoulder 36 continues to bear against the web 28 and drive the shaft 16. However, when the V-belt 20 is turned in the opposite direction, the pulley 18 will rotate with respect to the shaft 16 so that the web 28 now becomes aligned with the center of the slot 30. Further reverse movement of the V-belt 20 will result in a relative movement between the shaft 16 and the pulley 18 to the position indicated by broken lines in Figure 4. At this time, the V-belt 20 may be removed.

When the V-belt pulley 18 is in the position illustrated in Figure 2, the V-belt 20 may be changed as desired. When half of the V-belt 20 has been returned to its original position, it is merely necessary to drive the pulley 18 in its normal driving direction. This will cause the pulley 18 to ride up on the shaft 16 and again become engaged therewith in its normal drive connection.

It is to be noted that the key 26 extends the full width of the pulley 18. In order to position the pulley 18 longitudinally on the shaft 16, the shaft 16 is provided with collars 38 on opposite sides of the pulley 18. The collars 38 may be positioned on the shaft 16 by any desired means including cotter pins 40 passing through the shaft 16, as is illustrated in Figure 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A quick releasing pulley and shaft assembly comprising a shaft, a key carried by said shaft, a pulley mounted on said shaft, said pulley having a central opening in said pulley normally receiving said shaft, a key slot in said pulley receiving said key to form a drive connection between said pulley and said shaft, and an elongated extension of said central opening in said pulley, said extension being communicated directly with said key slot and extending away from said key slot, said opening, said key slot and said extension extending entirely through said pulley.

2. A quick releasing pulley and shaft assembly comprising a shaft, a key carried by said shaft, a pulley mounted on said shaft, said pulley having a central opening in said pulley normally receiving said shaft, a key slot in said pulley receiving said key to form a drive connection between said pulley and said shaft, and an elongated extension of said central opening in said pulley, said extension being communicated directly with said key slot and extending away from said key slot, said opening, said key slot and said extension extending entirely through said pulley, said key being channel-shaped and including a web and legs, said shaft having openings receiving said legs, said web being engaged in said key slot.

3. A quick releasing pulley and shaft assembly comprising a shaft, a key carried by said shaft, a pulley mounted on said shaft, said pulley having a central opening in said pulley normally receiving said shaft, a key slot in said pulley receiving said key to form a drive connection between said pulley and said shaft, and an elongated extension of said central opening in said pulley, said extension being communicated directly with said key slot and extending away from said key slot, said opening, said key slot and said extension extending entirely through said pulley, and means carried by said shaft for retaining said pulley in alignment with said key.

4. A quick release pulley and shaft assembly comprising a circular cross-sectional shaft, a key fixedly carried by said shaft, a pulley mounted on said shaft, said pulley having a central opening normally snugly receiving said shaft, a key slot in said pulley receiving said key to form a drive connection between said pulley and said shaft, and an elongated extension of said central opening in said pulley, said extension being communicated directly with said key slot and extending away from said key slot, a major portion of said extension having a width substantially the same as the diameter of the said shaft.

References Cited in the file of this patent
UNITED STATES PATENTS

| | | |
|---|---|---|
| 330,414 | Moyer | Nov. 17, 1885 |
| 1,391,728 | Fisher | Sept. 27, 1921 |

FOREIGN PATENTS

| | | |
|---|---|---|
| 296,995 | Germany | Mar. 15, 1917 |